Nov. 1, 1960 G. A. HARDENBERGH 2,958,787

MULTISTABLE MAGNETIC CORE CIRCUITS

Filed Aug. 16, 1957 2 Sheets-Sheet 1

2,958,787

MULTISTABLE MAGNETIC CORE CIRCUITS

George A. Hardenbergh, St. Paul, Minn., assignor to International Business Machines Corporation, New York, N.Y., a corporation of New York Filed Aug. 16, 1957, Ser. No. 678,734

6 Claims. (Cl. 307—88)

This invention relates to circuit devices which employ magnetic elements capable of assuming more than two stable states of magnetic retentivity in representing information values and is directed in particular to counter and register circuits employing multistable magnetic elements of this type.

Heretofore the application of magnetic core storage elements in computing and data handling equipment has been generally confined to circuitry for processing binary information wherein the two limiting stable states of flux remanence, which such cores are capable of assuming, are utilized in representing the two digital values in the binary notation and the storage elements are termed bistable. However, as is evidenced in the copending application, Serial No. 427,216 filed May 3, 1954 in behalf of Tenny Lode and assigned to the assignee of this application, magnetic cores are capable of being caused to assume a plurality of stable remanent states intermediate the two limiting states generally employed in binary systems. Such cores can be caused to assume different ones of these intermediate states by applying increments of magnetizing force, quantified as to magnitude and duration. By properly quantifying the magnetizing forces or impulses applied to the core, it is possible, for example, to cause the core to be stepped from one limiting state to the other limiting states in nine or ten steps. Cores operated in this manner are, of course, useful in representing decimal information values and the embodiments herein disclosed and described as illustrating the principles of the invention are directed toward decimal notation systems, though, of course, it should be understood that the choice of decimal systems is for the purpose of illustration and in no way restricts the application of the principles of the invention to systems using this particular arithmetic notation.

A primary object of the present invention is to provide novel multistable magnetic core circuits.

Another object is to provide a multistable magnetic core shift register circuit.

A further object is to provide a novel multistable core counting circuit.

Still another object is to provide a novel circuit arrangement for applying quantified magnetizing impulses to a multistable core.

Another object is to provide a counting circuit employing a multistable core which is driven by magnetizing impulses so quantified that a predetermined number is required to step the core from one limiting state to the other and wherein the flux change produced in the core as the result of the application of an impulse in excess of said predetermined number is utilized to effect resetting of the core and to provide a carry indication.

Another object is to provide novel multistable core shift register circuitry wherein a winding on one multistable core is utilized to control the transfer of information values, stored in that core, to another multistable core.

Other objects of the invention will be pointed out in the following description and claims and illustrated in the accompanying drawings, which disclose, by way of example, the principle of the invention and the best mode, which has been contemplated, of applying the principle.

Figure 1:
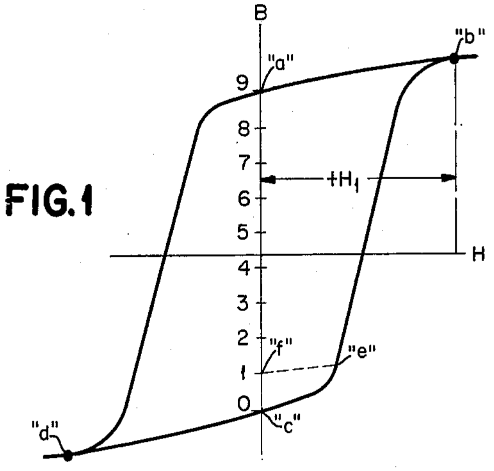
Fig. 1 is a diagrammatic representation of a hysteresis curve for magnetic materials such as may be utilized in practicing the invention.

Magnetic materials having the property of low coercive force and high residual magnetism may be readily magnitized in either of two opposite directions and caused to assume limiting remanent states in either of these directions. A core fabricated of such materials may be caused to assume one or the other of these limiting states by energizing, with pulses of proper polarity, one or more windings on the core, and the particular state existing may be determined by a voltage pulse induced in other windings when an interrogation pulse is applied to the core; a relatively large voltage pulse being induced when the interrogation pulse causes a flux reversal in the core and only a small voltage being induced when the interrogation pulse does not effect a flux reversal. Since the two limiting states are stable and distinguishable, cores of this nature may be utilized in storing binary information, the limiting state in one direction being representative of a binary one and the limiting state in the other direction being representative of a binary zero. Fig. 1 depicts a hysteresis loop for a core material such as might be utilized for this purpose. Such cores are usually said to have substantially rectangular hysteresis loops but may be also characterized by the fact that the ratio of their magnetic flux density, when in a limiting remanent state, to their magnetic flux density, when in a saturated state in the same direction, is relatively high. The letters *a* and *b* in Fig. 1, respectively, represent limiting and saturation states in one direction and the letters *c* and *d*, respectively, represent limiting and saturation states in the other direction.

If, for example, limiting state *a* is the binary zero representing state and limiting state *c* the binary one representing state, the application of an interrogation signal, effective to cause a positive magnetizing force $+H_1$ to be applied to the core, will cause the segment *cb* to be traversed. This traversal represents a large flux change, and a large signal output is thus induced in the output winding when the core is initially storing a binary one. When the core is initially storing a binary zero, the application of such an interrogation pulse causes the segment *ab* to be traversed. Since the ratio of flux density at *a* to that at *b* is relatively high, the flux change then effected is relatively small as is the amplitude of the signal induced on the output winding.

Magnetic cores, having a hysteresis loop such as described above, are employed in the present invention and in the description to follow, the coercive force, which is the force necessary to cause flux reversal, is considered to approximate a sharply defined constant under all conditions of magnetization. The magnetic state of the material, with reference to flux direction, remains essentially constant under the influence of magnetic forces less than the coercive force, and when the coercive force is exceeded slightly, the flux will be reversed at a rate determined by the electromotive force applied to the winding. The total change in flux density over a given time interval, during which flux reversal is being accomplished, is proportional to the integral of the applied electromotive force over the same time interval. This relationship is true, neglecting the losses in the winding, until all of the flux domains are reversed and the material begins to saturate.

It has been determined that the electromotive force need not be continuously applied during the above-mentioned time interval but may be applied in the form of pulses with the total change in flux density being directly proportional to the number, magnitude and direction of the individual pulses. Thus, a predetermined number of such magnetizing impulses, each having a particular constant amplitude and duration, are required to effect a change in the core from one limiting state to the other and different numbers of such pulses less than said predetermined number cause the core to assume different stable states of flux remanence intermediate the limiting states. Such pulses are termed quantified pulses and the number required to cause a predetermined change in flux density depends upon the ability of the associated apparatus to accurately quantify the pulses applied and to detect the changes produced by them in the core and windings. Such a core may have a plurality of stable states intermediate the upper and lower limiting states and may be employed, therefore, to store other than binary information.

Figure 2:
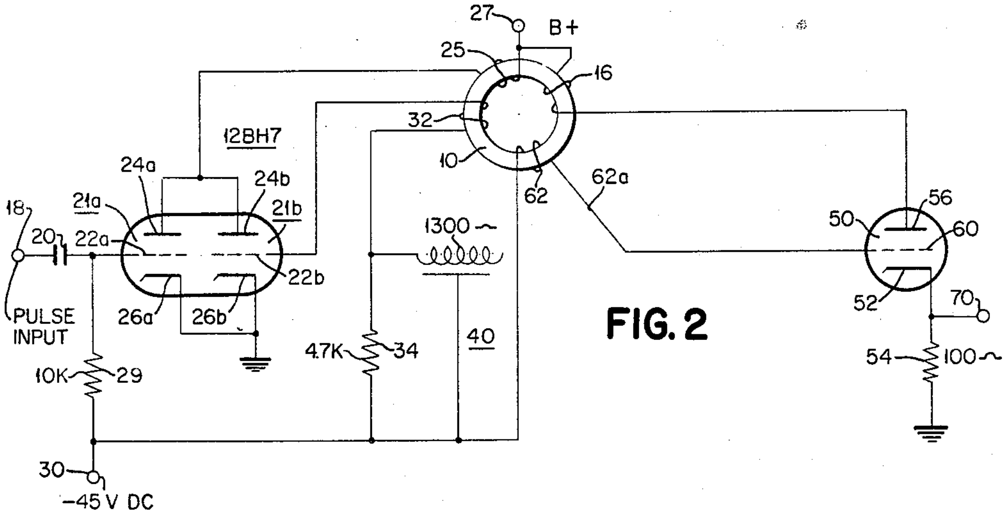
Fig. 2 is a diagrammatic representation of a decimal counter circuit utilizing a multistable magnetic core.

There is shown in Fig. 2, a decimal counter which utilizes a core 10, which is addressed with quantified pulses of a magnitude and duration such that nine quantified pulses are effective to switch the core from one limiting state to the other. The core is initially reset to the limiting state, designated *c*, by applying a magnetizing force of proper polarity and sufficient magnitude and duration to a winding such as a reset winding 16. The input pulses, quantified as to magnitude and duration in a manner later to be described, are effective to apply positive magnetizing force to the core. The limiting state *c* is the decimal zero representing state; the limiting state *a* is the decimal nine representing state; and the intermediate stable states are, as indicated, representative of the other values of decimal information. Input pulses to the counter are applied to a terminal 18, which is coupled through a capacitor 20 to one grid 22*a* of dual triodes 21*a* and 21*b*. Both plates 24*a* and 24*b* of these triodes are connected through an input winding 25 on core 10 to a positive source of potential at terminal 27 and both cathodes 26*a* and 26*b* are connected to ground. The grid 22*a* is coupled through a 10K resistor 29 to a negative source potential at a terminal 30 and the other grid 22*b* is coupled to the same terminal through a winding 32 on core 10 and a 4.7K ohm resistor 34. With no input applied to terminal 18, both triodes 21*a* and 21*b* are normally cut off. However, each pulse, applied to terminal 18 and transmitted through capacitor 20, is effective to render triode 21*a* conductive thereby causing current to flow from terminal 27 through the winding 25 and triode 21*a* to ground. This current flow renders winding 25 effective to apply magnetizing force, positive in sense with respect to the B—H loop of Fig. 1, to be applied to core 10. The magnetizing force thus applied is of sufficient intensity to initiate the switching of flux domains in the core material. This flux change causes a positive voltage to be developed at the upper terminal of winding 32 which voltage is applied to the grid 22*b* of triode 21*b* and renders that triode conductive. Conduction through this triode, which serves as a single swing blocking oscillator, furnishes another current path from terminal 27 through winding 25 to ground. The design is such that the input pulse applied to terminal 18 and to the grid of triode 22*a* is terminated after triode 21*b* begins conducting. The continued passing of current through triode 21*b*, and thus winding 25, causes flux reversal to continue in the core and a voltage to be maintained across winding 32. Since the voltage is fed back to the grid of the triode, conduction continues in the triode until either saturation is reached or the feedback is in some way interrupted. A delay line 40, connected to the junction between winding 32 and resistor 34, is provided to interrupt the feedback and thereby render triode 22*b* again nonconductive a predetermined time after the input pulse is initially applied. The voltage initially induced in winding 32 causes a voltage pulse to be transmitted down the delay line and it is the reflection of this pulse at junction 42 which is effective to sufficiently overcome the voltage induced in winding 32 to lower the voltage at grid 22*b* below cutoff and thereby terminate the switching of flux in the core. Thus, the pulse applied to the winding 25 is quantified as to time, the leading edge being determined by the leading edge of the input pulse applied to the grid 22*a* of tube 21*a* and the trailing edge being determined by the characteristics of delay line 40 which produces the delayed pulse which is effective to cut off triode 22*b*. This arrangement negates the necessity of accurately quantifying the input pulses applied to the circuit at terminal 18 and feedback winding 32 causes switching to continue once it is initiated for a time determined by the characteristics of the delay line 40.

The application of a pulse to terminal 18, with core 10 initially in the limiting or datum state of remanence at *c* of Fig. 1, causes a minor hysteresis loop *cef* to be traversed, the segment *ce* representing the change in flux density as flux domains are being reversed and the segment *ef* representing the slip back to a stable state after the reflection pulse produced by delay line 40 cuts off triode 21*b*. As is indicated, the stable state *f* is the decimal one representing state. The operation is similar as pulses are successively applied to the input terminal 18, each input pulse being effective to cause a quantified magnetizing force to be applied to the core causing it to assume the next higher stable state and nine such pulses being effective to cause the core to assume the other limiting state at *a*.

When an input pulse is applied to a decimal counter which is standing at nine, it is the usual practice that the pulse be effective to reset the counter zero and also produce a carry pulse which might be transmitted to the next higher order counter. The multistable core 10 of Fig. 1 is reset by a tube 50. This tube has its cathode 52 connected through a 100 ohm resistor 54 to ground. The plate 56 of this tube is connected through reset winding 16 on core 10 to positive potential source 27 and the grid 60 is connected through a further winding 62, which might be considered an output winding, on core 10 to negative potential source 30 which is effective to normally maintain the grid below the cutoff potential.

Figure 3:
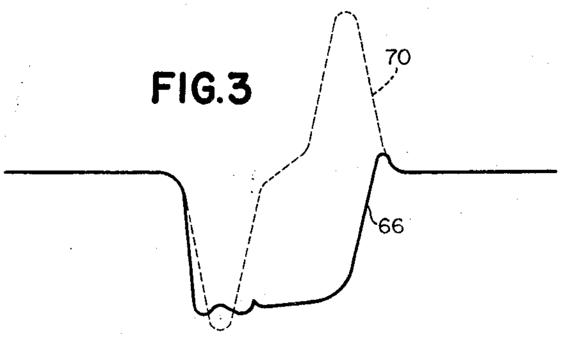
Fig. 3 is a representation of pulses produced in response to flux changes effected in the multistable core of Fig. 2.

There are shown in Fig. 3 wave forms typical of those developed at the upper terminal 62*a* of winding 62 and, thus, applied to the grid 60 of triode 50, when input pulses are applied to the circuit. The pulse shape 66 is representative of the negative pulses developed at this point for each of the first nine input pulses applied to terminal 18. It should be noted that there is only a very small positive swing at the termination of this wave form. This is due to the fact that the flux changes experienced during the nine steps up the loop involve reversal of flux domains and, because of the hysteretic relationship between applied magnetizing force and flux density during this domain action, equal and opposite flux changes are not produced at the termination of each increment of applied magnetizing force. This is indicated by the nearly flat segment *ef* of the minor hysteresis loop traversed when the core is stepped from zero to one. When, however, the tenth pulse is applied, the loop of Fig. 1 is traversed along the portion *ab* which is a saturation portion of the loop and the flux change then experienced, as the core is driven from remanence to saturation, is reversible. Thus, a wave form such as shown at 70 is developed at terminal 62*a*, the initial positive swing being due to the flux change as the loop is traversed from remanence at *a* toward saturation at *b* and the positive swing being developed as the same segment is traversed in the opposite direction. The initial negative pulse developed under these latter conditions is of shorter duration than the normal pulse since, as the core is saturated, the flux change sensed by winding 32 becomes insufficient to induce in this winding a sufficient voltage to maintain the grid of triode 21*b* above cutoff.

The positive voltage developed at the upper terminal 62*a* of winding 62, as the core material goes from saturation to the upper limiting state after the termination of the tenth pulse applied to winding 25, is of sufficient amplitude to raise the potential at the grid 60 of the tube 50 above cutoff, thereby causing the tube to conduct and a current to flow through reset winding 62. The design is such that the magnetomotive force applied to core 10 as a result of the current then caused to flow through this winding is sufficient to completely reverse the flux and cause the core, when tube 50 again becomes nonconductive, to assume the initial limiting state at *c* representative of a decimal zero. Accompanying this resetting, accomplished when an input pulse is applied to the core when at remanent state *a* and thus representing a decimal 9, there is produced at a carry terminal 70 a carry pulse, which indicates the transition from nine to zero and which may be transmitted to the counter for the next higher order.

Figure 4:
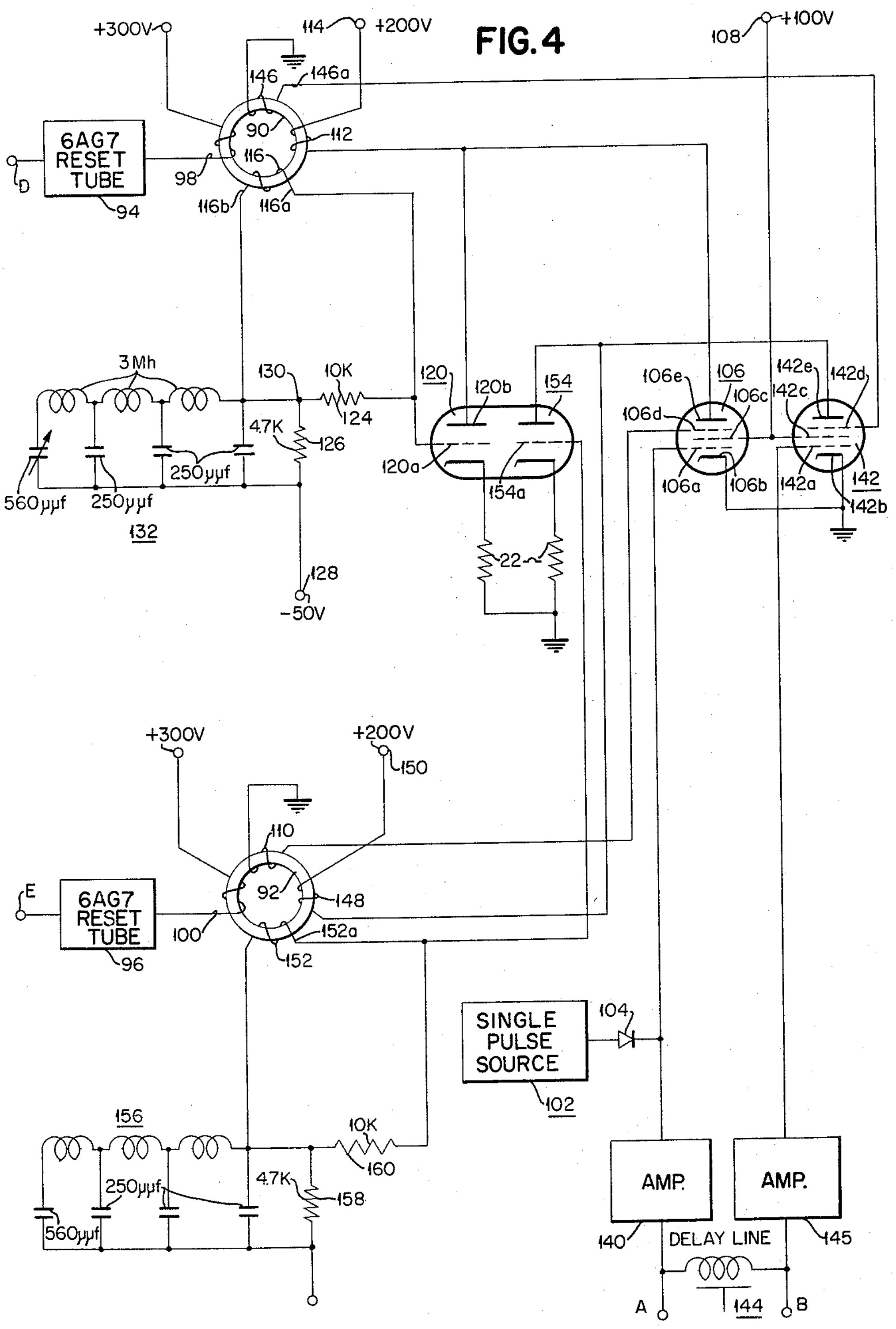
Fig. 4 is a diagrammatic representation of a multistable magnetic core shift register circuit.

Fig. 4 shows a decimal shift register which includes two multi-path cores 90 and 92. Though there is shown, in this illustrative embodiment, only two storage cores and the circuitry necessary to transfer information from one to the other and thence back to the original core, it should be understood that a decimal shift register including any number of such stages may be easily constructed in accordance with the principles demonstrated by the structure of this embodiment. Initially each of the cores 90 and 92 is reset to the remanent condition at *c* of Fig. 1 by pulses applied to terminals D and E. These pulses render reset tubes 94 and 96 conductive causing current flow through reset windings 98 and 100, respectively. This current flow causes the cores to be subjected to a magnetizing force of proper polarity and sufficient magnitude and duration to cause the cores to assume the lower limiting state of remanence at *c*. Decimal information is then entered in core 90 from a pulse source designated 102 which applies discrete pulses of positive polarity through a diode 104 to the control grid 106*a* of a pentode 106. Pentode 106 has its cathode 106*b* connected to ground, its screen grid 106*c* connected to a positive source of potential at 108, its suppressor grid 106*d* coupled through a transfer winding 110 on core 92 to ground, and its plate 106*e* connected through a drive winding 112 on core 90 to a source of positive potential at terminal 114. In the absence of positive pulses applied to control grid 106*a*, pentode 106 is normally not conducting, however, the application of a positive pulse, supplied by source 102, to the control grid 106*a* renders the pentode conductive and causes current flow from terminal 114 through winding 112 and the pentode 106 to ground. The current flow through winding 112 is in the proper direction to cause a positive magnetizing force to be applied to core 96 thereby initiating flux reversal in the core. This flux change is sensed by a winding 116 causing a positive voltage to be developed at one terminal 116*a* of the winding which is connected to the grid 120*a* of a triode 120. The grid 120*a* of triode 120 is connected through a pair of resistors 124 and 126 to a negative source of potential at 128 which normally maintains the tube cutoff. A junction 130 between these resistors is connected to the other terminal 116*b* of winding 116. When a voltage is developed on winding 116, the grid of tube 120 is raised above cutoff and the tube is rendered conductive. At the same time a current is caused to flow through the winding circuit which causes a voltage to be developed across resistor 126 and applied to an L–C delay line generally designated 132. Triode 120 serves as a single swing blocking oscillator. This triode has its plate 120*b* connected to drive winding 112 and, once rendered conductive, allows current to flow through this winding and thereby continues the flux reversal in core 90 until the reflected pulse from delay line 132 cuts off the triode.

The increments of magnetizing force thus applied to core 90 by winding 98 are so quantified as to magnitude and duration that ten input pulses are required to be applied by pulse source 102 to cause the core to be stepped from the lower limiting condition at *c* of Fig. 1 to the upper limiting at *a*. The lower limiting state at *c* is the decimal zero representing state; the upper limiting state at *a* is the decimal ten representing state; and the decimal values one through nine are represented at successive stable states between these limiting states. When input information is applied to the circuit in the form of a series of individual pulses supplied by source 102, the multistable core 90 is caused to assume the one of these stable states which corresponds to the number of input pulses applied. After the input information decimal value has been thus entered, it may be shifted from core 90 to core 92 by applying a series of ten shift pulses to a shift input terminal designated A in Fig. 4. Each of these pulses is suitably amplified by an amplifier 140, shown in block form, and then applied to the control grid 106*a* of pentode 106. The operation of the input circuitry is then the same as explained above with reference to the application of input information by pulse source 102; each pulse applied to the grid 106*a* causing to be applied to core 90 an increment of magnetizing force so quantified that ten such increments are required to switch the core from the lower limiting state at *c* to the upper limiting state at *a*. However, here when an input decimal value has been initially entered in the core 90, the number of such increments, or magnetizing impulses, necessary to drive the core to the other limit is determined by the particular one of the decimal representing states the core has been caused to assume by the series of input information pulses. When, for example, four input pulses have been originally applied by source 102 and core 90 is thus initially in the decimal four representing state, the sixth of the series of shift pulses applied to terminal A causes the core to assume the limiting state at *a* and each of the remaining four shift pulses effect reversible excursions along the saturation portion *ab* of the loop of Fig. 1.

The shifting of the decimal information from multistable core 90 to multistable core 92 is, in the main, controlled by a pentode 142, which has its cathode 142*b*, anode 142*e* and three grids 142*a*, 142*c* and 142*d* connected to potential sources in a manner similar to the like elements of pentode 106 and which is normally nonconductive. The shift pulses applied at terminal A are transmitted through a delay line 144 to a amplifier 145 and thence applied to the control grid 142*a* of pentode 142. The pulses thus applied to grid 142*a* are of sufficient magnitude to render the pentode conductive when the suppressor grid 142*d* of the tube is at ground potential, which is the condition when no flux changes are being effected in core 90 since suppressor grid 142*d* is connected through a winding 146 on this core to ground. When, however, the shift pulses, applied to the grid of the tube 106, are effective to cause reversal of flux domains in the core, that is, to step the core from one stable state to the next higher stable state in the direction of the limiting state at *a*, a negative pulse such as is shown in Fig. 3 at 66 is developed at the terminal 146*a* of winding 146. The duration of the shift pulses applied at terminal A and the characteristics of delay line 144 are such that this negative pulse induced in winding 146 maintains the suppressor grid 142*d* sufficiently negative during the duration of the application of the delayed pulse to the grid 142*a* of pentode 142 to prevent the pentode from conducting. The pentode 142*a* is, in this manner, prevented from being rendered conductive by each one of the shift pulses until the limiting state at *a* of core 90 is reached. When this occurs each of the remaining shift pulses, applied to the grid of tube 106, causes a pulse, such as is shown at 70 in Fig. 3, to be induced in winding 146. This pulse, as shown, includes a negative swing of only brief duration and the shift pulses as delayed by delay line 144 and thence applied to control grid 142*a* are then effective to render pentode 142 conductive. This pentode is rendered conductive by each of the shift pulses applied after core 90 reaches the limiting state at *a*. When, for example, core 90 is initially in an intermediate stable state representing a decimal value of four, the sixth shift pulse applied causes the core to reach limiting state *a* and each of the remaining four shift pulses in the series, as transmitted through delay line 144, is effective to fire pentode 142.

The plate 142*e* of pentode 142 is connected through a drive winding 148 on core 92 to a source of positive potential at a terminal 150. Each time pentode 142 is made to conduct, for example, when each of the last four delay shift pulses are applied under the conditions stated above, current is caused to flow through winding 148 and magnetizing force is applied to the core 92 in a direction to cause flux changes away from the reset condition of this core, which is shown at *c* in Fig. 1. These flux changes are sensed by a feedback winding 152 causing a positive voltage to be developed at the terminal 152*a* of this winding. Winding 152 is coupled to the grid 154*a* of a triode 154, which triode functions in the same manner as triode 120 in the drive circuit to core 90. The plate of the triode is connected to drive winding 148 to continue the flux change in core 92 until the reflection of the pulse, applied to a delay circuit 156 when the flux change is initially sensed by winding 152, cuts off triode 154. The winding 152, triode 154 and delay circuit 156 function in conjunction with a pair of resistors 158 and 160 in the same manner as do like components in the circuit of feedback winding 116 on core 90, to quantify the magnetizing force applied by winding 148 to core 92. The quantification is the same as above described, that is, ten such increments of magnetizing force are required to step core 92 from the lower limiting state at *c* of Fig. 1 to the upper limiting state at *a*. Thus, where as above, core 90 is initially storing a decimal four, and the last four of the series of ten delay shift pulses applied to the control grid 142*a* of pentode 142 are effective to fire that tube, four such increments of magnetizing force are successively applied by winding 148 to core 92 and this core is thus caused to assume an intermediate stable state of flux density representative of a decimal value of four. Pentode 142 thus serves as a gate, which is operated under control of the pulses developed on winding 146 to control the application of shift pulses to the input winding means on core 92.

This decimal value may then be shifted back from core 92 to core 90. Anticipatory of such an operation, a reset pulse is applied at terminal D to reset core 90. Then a series of ten shift pulses are applied at terminal B, which pulses are amplified by an amplifier 145 and applied to the control grid 142*a* of pentode 142. Since no flux changes are caused in core 90 by the shift pulses until after core 92 has been driven to the limiting condition at *a*, suppressor grid 142*d* is at ground potential and each of the shift pulses applied at terminal B cause pentode 142 to be rendered conductive and a quantified increment of magnetizing force to be applied to core 92 by winding 148. The sixth of the series of shift pulses causes this core to reach limiting state *a* and the waveform of the pulses developed on transfer winding 110 on core 92 for each of these six pulses is shown at 66 in Fig. 3. Winding 110 is connected to the suppressor grid 106*d* of pentode 106. The shift pulses applied to terminal B are transmitted through delay line 144 and amplifier 140 to the grid 106*a* of pentode 106. The operation is similar to that described with reference to the transfer of information from core 90 to core 92. Each of the output pulses developed on winding 110 until core 92 reaches limiting state *a*, here six in number, renders the delayed shift pulse applied to grid 106*a* ineffective to render the pentode conductive. However, each of the last four shift pulses are effective to fire pentode 106 and, in a manner described above with reference to the original input of information to core 90, four quantified increments of magnetizing force are applied by winding 112 to core 90, thereby causing this core to assume an intermediate state representing the decimal value, four.

While the circuit of Fig. 4, for illustrative purposes shows in detail the manner in which decimal information might be transferred between two multistable cores, it is of course obvious that the circuit may be adapted to include a number of such cores, each either representing a decimal order or being utilized as an intermediate storage element in the transfer of decimal values from one decimal order to the next.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. In a register circuit, first and second cores of magnetic material each capable of assuming first and second limiting states of flux remanence and a plurality of states of flux remanence intermediate said first and second states, said remanent states being representative of information values, first and second input winding means on said first and second cores, respectively, controllable to apply magnetizing impulses to said cores, a predetermined number of said impulses applied to either core being effective to cause that core to assume said second limiting state and a lesser number being effective to cause that core to assume one of said intermediate states, information input pulse means coupled to said first input winding means for controlling said first input winding means to selectively apply one or more magnetizing pulses to said first core and thereby cause said first core to assume one of said states of flux remanence representative of a particular information value, the value stored in said first core depending upon the number of pulses applied by said information input pulse means, shift pulse means coupled to said first input winding means for controlling said first input winding means to apply to said core a series of magnetizing impulses, and further winding means on said first core coupled to said second input winding means for controlling said second input winding means to apply to said second core a number of magnetizing impulses effective to cause said second core to assume the particular one of said intermediate states of flux remanence which is representative of said particular information value originally entered in said first core by said information input pulse means.

2. In a register circuit, first and second cores of magnetic material each capable of assuming first and second limiting states of flux remanence and a plurality of states of flux remanence intermediate said first and second states, each of said remanence states being representative of a decimal information value, first and second input winding means on said first and second cores, respectively, controllable to apply magnetizing impulses to said cores, a predetermined number of said impulses applied to either core being effective to cause that core to assume said second limiting state and a lesser number being effective to cause that core to assume one of said intermediate states, information input pulse means coupled to said first input winding means for controlling said first input winding means to apply a particular number of magnetizing pulses to said first core and thereby cause said first core to assume a particular one of said states of flux remanence representative of a particular decimal information value, shift pulse means coupled to said first input winding means for controlling said first input winding means to apply to said core a series of magnetizing impulses, gating means, said shift pulse means being coupled through said gating means to said second input winding means, and further winding means on said first core coupled to said gating means for controlling the delivery of shift pulses to said second input winding means, whereby said second core is caused to assume the one of said states of flux remanence which is representative of the decimal value originally entered in said first core by said information input pulse means.

3. In a register circuit, first and second cores of magnetic material each capable of assuming first and second limiting states of flux remanence and a plurality of intermediate states of flux remanence representative of different information values, first and second means inductively associated with said first and second cores, respectively, for causing said cores to initially assume said first limiting state, first and second input winding means on said first and second cores, respectively, first pulse supplying means coupled to said first input winding means for selectively applying thereto one or more discrete information pulses effective to cause said core to assume one of said states of flux remanence representative of a particular information value, the value stored in said first core depending upon the number of information pulses applied thereto; second pulse means coupled to said first input winding means for supplying a series of discrete shift pulses; a first group of said shift pulses in said series being effective to cause said first core to assume said second limiting state and a second group of said shift pulses in said series being ineffective to cause said core to assume another stable state, the number of shift pulses in said groups being dependent upon the value stored in said first core by said information pulses; means coupling said second pulse means and said second winding means and controllable to apply pulses to said second core in response to shift pulses supplied by said second pulse means, and further winding means on said first core for controlling said coupling means to be responsive to a number of shift pulses equal to the number in one of said groups, whereby the value originally stored in said first core is shifted to said second core.

4. In a register circuit, first and second cores of magnetic material each capable of assuming ten different stable states of flux remanence each representative of a different decimal value, first and second input winding means on said first and second cores, respectively, pulse means coupled to said first input winding means for supplying a series of discrete shift pulses; a first group of said pulses in said series being effective to cause said first core to assume said second limiting state and a second group of said shift pulses in said series being ineffective to cause said core to assume another stable state, the number of pulses in each of said groups varying in accordance with the particular decimal value representing state said first core is in when the first of said series of shift pulses is supplied, means coupling said pulse supplying means and said second input winding means and controllable to apply pulses to said second core in response to shift pulses supplied by said pulse means, and further winding means on said first core for controlling said coupling means to be responsive to a number of shift pulses equal to the number in one of said groups, whereby said second core is caused to assume a one of said decimal value representing states indicative of the decimal value stored in said first core prior to the application of said shift pulses.

5. The invention as claimed in claim 4 wherein said means coupling said pulse supplying means and said second input winding means comprises an electron discharge device having an anode and first and second control elements, said second input winding being coupled to said anode, said pulse supplying means being coupled to said first control element, and said further winding means being coupled to said second control element.

6. In a decimal shift register; first and second cores of magnetic material each capable of assuming first and second limiting states of flux remanence and a number of intermediate states of flux remanence sufficient to store each of the values of an order of decimal information; first and second input winding means each on an associated one of said first and second cores for applying magnetizing pulses thereto to cause said cores to selectively assume any one of said decimal information representing states; ten such magnetizing pulses being effective to step either of said cores from said first limiting state through said intermediate states to said second limiting state; and means for shifting a decimal value stored in either of said cores to the other of said cores comprising; a source of shift pulses; controllable gating means coupling said source of shift pulses to each of said input winding means; and further winding means on each of said cores and coupled to said gating means for controlling said gating means when a series of shift pulses is applied thereto by said shift pulse source to shift a decimal value from one of said cores to the other of said cores to direct to the input winding means on the other of said cores the proper number of pulses to cause said other core to assume the state of flux remanence representative of the decimal value originally stored in said one core.

References Cited in the file of this patent

UNITED STATES PATENTS

| | | |
|---|---|---|
| 2,757,297 | Evans et al. | July 31, 1956 |
| 2,777,098 | Duffing | Jan. 8, 1957 |
| 2,808,578 | Goodell et al. | Oct. 1, 1957 |
| 2,846,670 | Torrey | Aug. 5, 1958 |

OTHER REFERENCES

"A Predetermined Scaler Utilizing Transistors and Magnetic Cores," by R. I. Van Nice and R. C. Lyman; Proceedings of the National Electronics Conference, October 3–5, 1955, vol. XI, pp. 859–869.